United States Patent
Yamada et al.

(10) Patent No.: US 11,017,262 B2
(45) Date of Patent: May 25, 2021

(54) METHOD AND DEVICE TO DETERMINE IMAGE FEATURES USING MULTI-RESOLUTION GRADIENT ANALYSIS

(71) Applicants: EQUOS RESEARCH CO., LTD., Tokyo (JP); KYUSHU INSTITUTE OF TECHNOLOGY, Kitakyushu (JP)

(72) Inventors: Hideo Yamada, Tokyo (JP); Kazuhiro Kuno, Tokyo (JP); Hakaru Tamukoh, Kitakyushu (JP); Shuichi Enokida, Iizuka (JP); Shiryu Ooe, Kitakyushu (JP)

(73) Assignees: EQUOS RESEARCH CO., LTD., Tokyo (JP); KYUSHU INSTITUTE OF TECHNOLOGY, Kitakyushu (JP)

( * ) Notice: Subject to any disclaimer, the term of this patent is extended or adjusted under 35 U.S.C. 154(b) by 107 days.

(21) Appl. No.: 15/771,840
(22) PCT Filed: Mar. 30, 2017
(86) PCT No.: PCT/JP2017/013280
§ 371 (c)(1),
(2) Date: Apr. 27, 2018
(87) PCT Pub. No.: WO2017/170877
PCT Pub. Date: Oct. 5, 2017

(65) Prior Publication Data
US 2018/0322361 A1 Nov. 8, 2018

(30) Foreign Application Priority Data
Mar. 30, 2016 (JP) .............................. JP2016-068437

(51) Int. Cl.
G06K 9/46 (2006.01)
G06K 9/00 (2006.01)
(52) U.S. Cl.
CPC ....... *G06K 9/4647* (2013.01); *G06K 9/00986* (2013.01); *G06K 9/00973* (2013.01)

(58) Field of Classification Search
CPC ........... G06K 9/00973; G06K 9/00986; G06K 9/4647
See application file for complete search history.

(56) References Cited

FOREIGN PATENT DOCUMENTS

| JP | 2009-301104 A | 12/2009 |
| JP | 2013-097583 A | 5/2013 |

(Continued)

OTHER PUBLICATIONS

Costea, Arthur Daniel, Andreea Valeria Vesa, and Sergiu Nedevschi. "Fast pedestrian detection for mobile devices." 2015 IEEE 18th International Conference on Intelligent Transportation Systems. IEEE, 2015. (Year: 2015).*

(Continued)

*Primary Examiner* — Nirav G Patel
(74) *Attorney, Agent, or Firm* — Oliff PLC

(57) ABSTRACT

A hardware configuration is constructed for calculating at high speed the co-occurrence of luminance gradient directions between differing resolutions for a subject image. In an image processing device, a processing line for high-resolution images, a processing line for medium-resolution images, and a processing line for low-resolution images are arranged in parallel, and the luminance gradient directions are extracted for each pixel simultaneously in parallel from images having the three resolutions. Co-occurrence matrix preparation units prepare co-occurrence matrices by using the luminance gradient directions extracted from these images having the three resolutions, and a histogram preparation unit outputs a histogram as an MRCoHOG feature amount by using these matrices. To concurrently processing the images having the three resolutions, high-speed processing can be performed, and moving pictures output from a camera can be processed in real time.

16 Claims, 12 Drawing Sheets

(56) References Cited

FOREIGN PATENT DOCUMENTS

| JP | 2014-010544 A | 1/2014 |
| JP | 2015-138462 A | 7/2015 |
| WO | 2011/037097 A1 | 3/2011 |

OTHER PUBLICATIONS

Harris, Mark. "How to Access Global Memory Efficiently in CUDA C/C++ Kernels." NVIDIA Developer Blog, NVIDIA, May 15. 2018, devblogs.nvidia.com/how-access-global-memory-efficiently-cuda-c-kernels/. (Year: 2013).*

Iwata, Sohei, and Shuichi Enokida. "Object detection based on multiresolution cohog." International Symposium on Visual Computing. Springer, Cham, 2014. (Year: 2014).*

Ryusuke Miyamoto et al. "Parallel Implementation Strategy for CoHOG-Based Pedestrian Detection Using a Multi-Core Processor." IEICE Trans. Fundamentals, vol. E94-A, pp. 2315-2322, 2011.

Sohei Iwata et al."Object Detection Based on Multiresolution CoHOG." International Conference on Computer Analysis of Images and Patterns, pp. 427-437, 2014.

Yuta Yamasaki et al. "Evaluation of Hardware Oriented MRCoHOG using Logic Simulation" International Conference on Computer Vision Theory and Applications, pp. 341-345, 2017.

Oct. 14, 2019 Extended Search Report issued in European Patent Application No. 17775411.6.

Yamazaki et al., "Hardware-Oriented Calculation Method of Image Feature Quantities for Human Detection," Information and Systems Society Special Session Gakusei Poster Session Yokoshu, The Institute of Electronics, Information and Communication Engineers, Mar. 16, 2016, p. 172.

Jun. 20, 2017 International Search Report issued in International Patent Application No. PCT/JP2017/013280.

Oct. 2, 2018 International Preliminary Report on Patentability issued in International Patent Application No. PCT/JP2017/013280.

\* cited by examiner

HOG FEATURE AMOUNT

CoHOG FEATURE AMOUNT

MRCoHOG FEATURE AMOUNT

FIG.4(a)

$$m(x, y) = \sqrt{f_x(x,y)^2 + f_y(x,y)^2} \quad \cdots (1)$$

$$m(x, y) = |f_x(x,y)| + |f_y(x,y)| \quad \cdots (2)$$

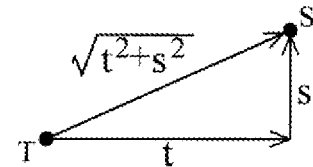

FIG.4(b)

$$\theta(x, y) = \tan^{-1} \frac{f_y(x,y)}{f_x(x,y)} \quad \cdots (3)$$

|  | a | b | c | d |
|---|---|---|---|---|
| $f_x(x,y)$ | POSITIVE | NEGATIVE | POSITIVE | NEGATIVE |
| $f_y(x,y)$ | POSITIVE | NEGATIVE | NEGATIVE | POSITIVE |
| $\dfrac{f_y(x,y)}{f_x(x,y)}$ | POSITIVE | POSITIVE | NEGATIVE | NEGATIVE |

11

$$a \to (x, y) = \begin{cases} 0° & : y \leq x \\ 45° & : y > x \end{cases}$$

$$b \to (x, y) = \begin{cases} 90° & : -y \leq x \\ 135° & : -y > x \end{cases}$$

$$c \to (x, y) = \begin{cases} 180° & : y \geq x \\ 225° & : y < x \end{cases}$$

$$d \to (x, y) = \begin{cases} 270° & : -y \geq x \\ 315° & : -y < x \end{cases}$$

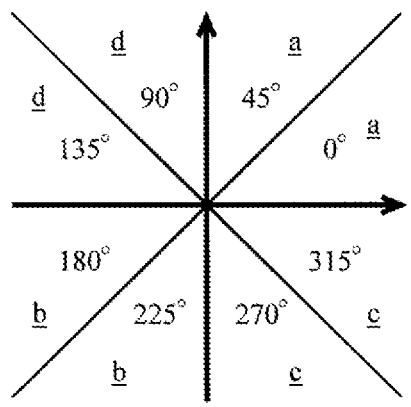

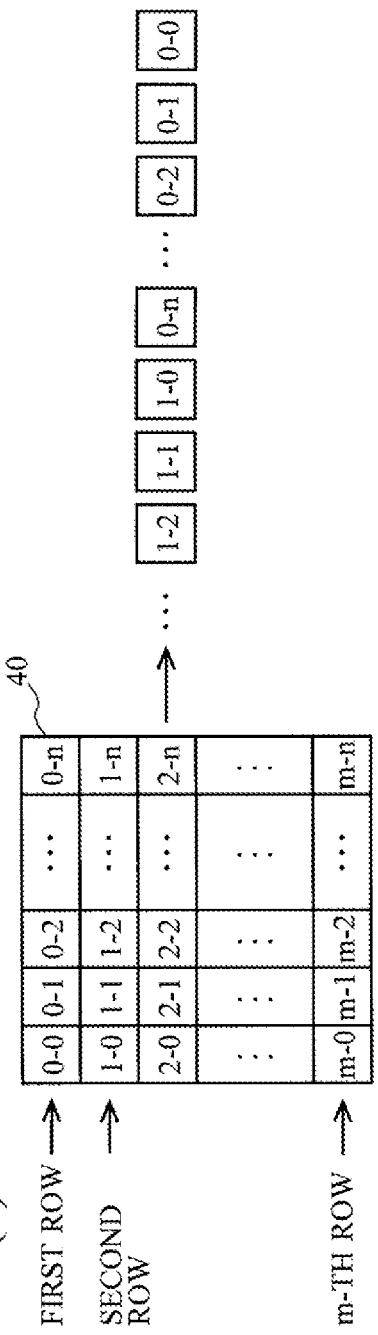
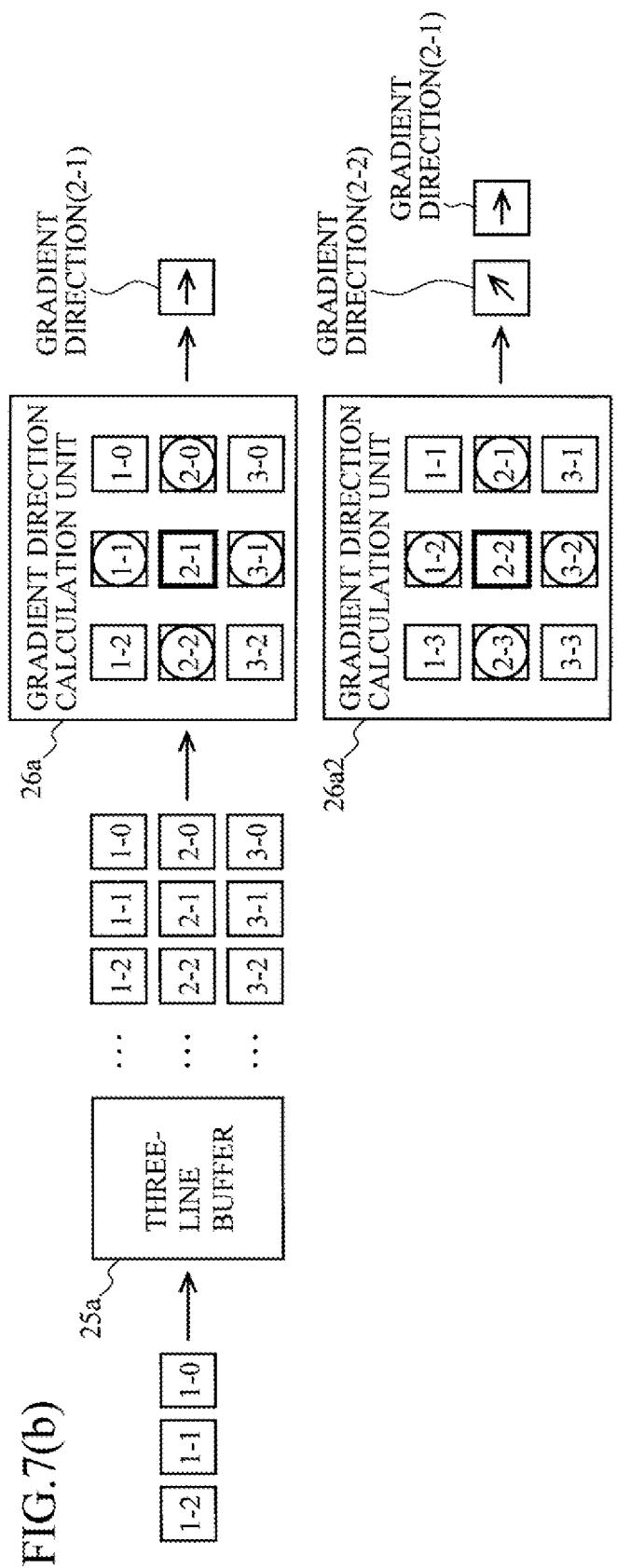
FIG.7(a)
FIG.7(b)

FIG.9

| 55 → | 1 | 2 | 3 | 4 | 5 | 6 | 7 | ... | 24 | 25 | 26 | 27 | 28 | 29 | 30 |
| 56 → | 1 | | 2 | | 3 | | 4 | ... | 13 | | 14 | | 15 | | 16 |
| 57 → | 1 | | | | 2 | | | ... | 7 | | | | 8 | | |

MRCoHOG FEATURE AMOUNT SPACE

METHOD AND DEVICE TO DETERMINE IMAGE FEATURES USING MULTI-RESOLUTION GRADIENT ANALYSIS

TECHNICAL FIELD

The present invention relates to an image processing device, a semiconductor device, an image recognition device, a mobile device, and an image processing method, and relates to, e.g., devices and a method which acquire image feature amounts from images.

BACKGROUND ART

As image recognition technologies, there is one configured to extract a luminance gradient distribution as an image feature amount from each image, compare it with previously learned luminance gradient distributions of images, and thereby recognize an object.

As the image feature amounts based on the luminance gradient distributions, an HOG (Histogram of Oriented Gradients) feature amount is well known and has been actively studied.

As a feature amount developed from the HOG feature amount, there is CoHOG (Co-occurrence HOG), and it has more robustness than HOG.

Devices which extract a CoHOG feature amount of each image are formed as IC chips to be mounted in video capture boards or the like, and they have been extensively put to practical use.

As a technology using CoHOG, there is "a pattern recognition method and a pattern recognition device using the method" of Patent Literature 1.

In recent years, an MRCoHOG (Multi Resolution CoHOG) feature amount having more robustness than the CoHOG feature amount has been suggested.

Experiments have revealed that the MRCoHOG feature amount has extremely high robustness.

Meanwhile, to extract the MRCoHOG feature amount, it is necessary to perform complicated processing, i.e., producing a plurality of pieces of image data having different resolutions from image data output from a video camera and calculating elements in co-occurrence matrices among the images having the different resolutions.

Thus, to recognize images output from a video camera in real time, how to load an MRCoHOG feature amount extraction algorithm into a hardware configuration which operates at high speed is a problem.

CITATION LIST

Patent Literature

Patent Literature 1: International Publication No. WO 2011/037097

DISCLOSURE OF THE INVENTION

Problem to be Solved by the Invention

It is an object of the present invention to build a hardware configuration which calculates at high speed co-occurrences of luminance gradient directions at different resolutions for an image which is an object.

Means for Solving the Problem (1) In order to achieve above mentioned object, the invention described in claim 1 provides an image processing device comprising: luminance outputting means for sequentially outputting luminances of pixels constituting an image based on an order of pixels; gradient direction outputting means for sequentially outputting gradient directions of luminances of the respective pixels having a plurality of resolutions in parallel in accordance with each resolution with the use of the sequentially output luminances; co-occurrence matrix preparing means for preparing a co-occurrence matrix including co-occurrences of the gradient directions at the different resolutions by sequentially combining the sequentially output gradient directions for each of the resolutions; and co-occurrence matrix outputting means for outputting the prepared co-occurrence matrix as an image feature amount of the image.

(2) The invention described in claim 2 provides the image processing device according to claim 1, wherein the gradient direction outputting means comprises a plurality of resolution-specific gradient direction outputting means which are provided in parallel in accordance with the plurality of resolutions respectively, and output gradient directions of luminances of the pixels having a corresponding resolution from the sequentially output luminances; and the resolution-specific gradient direction outputting means are concurrently operated to sequentially output the gradient directions for each of the resolutions in parallel.

(3) The invention described in claim 3 provides the image processing device according to claim 2, wherein each of the resolution-specific gradient direction outputting means selects the luminances sequentially output from the luminance outputting means with the use of a frequency based on a corresponding resolution to sequentially output the luminances at the corresponding resolution, and it also outputs gradient directions at the corresponding resolution by using the output luminances.

(4) The invention described in claim 4 provides the image processing device according to claim 2 or 3, wherein each of the resolution-specific gradient direction outputting means identifies luminances of adjacent pixels which are horizontally and vertically adjacent to a pixel of interest based on an order of outputting the luminances at the corresponding resolution, and it also outputs a gradient direction of the pixel of interest by using the identified luminances of the adjacent pixels.

(5) The invention described in claim 5 provides the image processing device according to claim 4, wherein each of the resolution-specific gradient direction outputting means acquires horizontal luminance gradient intensity and a vertical luminance gradient intensity of the pixel of interest by using the identified luminances of the adjacent pixels, and it outputs quantized gradient directions by making reference to a correspondence table, in which positive and negative and magnitudes of horizontal luminance gradient intensity and vertical luminance gradient intensity are associated with the quantized gradient directions, as to the acquired horizontal luminance gradient intensity and vertical luminance gradient intensity.

(6) The invention described in claim 6 provides the image processing device according to claim 4 or 5, wherein each of the resolution-specific gradient direction outputting means identifies the luminances of the adjacent pixels by arranging the luminances in an array where positions of the adjacent pixels are associated based on the order of outputting the luminances at the corresponding resolution.

(7) The invention described in claim 7 provides the image processing device according to claim 6, wherein the array is constituted of three arrays corresponding to a pixel row to which the pixel of interest belongs and two pixel rows which are vertically adjacent to the pixel row, and each of the resolution-specific gradient direction outputting means arranges luminances of the three pixel rows in the corresponding three arrays, and identifies the luminances of the adjacent pixels based on positions at which the luminances are arranged.

(8) The invention described in claim 8 provides the image processing device according to any one of claims 1 to 7, wherein the co-occurrence matrix preparing means sequentially identifies a gradient direction of the pixel of interest and gradient directions of pixels which are combined with the pixel of interest based on an order of outputting the gradient directions at each resolution which are sequentially output from the gradient direction outputting means, and it sequentially performs voting in the co-occurrence matrix based on combinations of the identified gradient directions to prepare the co-occurrence matrix.

(9) The invention described in claim 9 provides the image processing device according to claim 8, wherein the co-occurrence matrix preparing means arranges the gradient directions in arrays, in which the pixel of interest is associated with positions of the pixels combined with the pixel of interest and which are provided for each of the resolutions, in accordance with each of the resolutions based on the outputting order for each of the resolutions to identify the gradient directions of the combined pixels.

(10) The invention described in claim 10 provides the image processing device according to claim 9, wherein the arrays are constituted of six arrays corresponding to respective pairs of pixel rows which are vertically adjacent to each other for each of the resolutions, and the co-occurrence matrix preparing means arranges the gradient directions in each pair of pixel rows for each resolution in the corresponding pair of arrays, and identifies the gradient directions of the combined pixels based on positions at which the gradient directions are arranged.

(11) The invention described in claim 11 provides a semiconductor device comprising: the image processing device according to any one of claims 1 to 10 mounted therein.

(12) The invention described in claim 12 provides an image recognition device comprising: the image processing device according to any one of claims 1 to 10; and recognizing means for comparing a histogram based on a co-occurrence matrix output from the image processing device with a histogram based on a co-occurrence matrix of a reference image to recognize an object shown in the image.

(13) The invention described in claim 13 provides a mobile device comprising: detecting means for detecting an object by using the image recognition device according to claim 12; and moving means for moving to a predetermined position to the detected object.

(14) The invention described in claim 14 provides an image processing method comprising: a luminance output step of sequentially outputting luminances of pixels constituting an image based on an order of the pixels; a gradient direction output step of sequentially outputting gradient directions of the luminances of the respective pixels at a plurality of resolutions in parallel in accordance with each of the resolutions by using the sequentially output luminances; a co-occurrence matrix preparation step of preparing a co-occurrence matrix including co-occurrences of the gradient directions at the different resolutions by sequentially combining the sequentially output gradient directions for the respective resolutions; and a co-occurrence matrix output step of outputting the prepared co-occurrence matrix as an image feature amount of the image.

Effect of the Invention

According to the present invention, concurrently processing luminances of pixels having different resolutions enables building a hardware configuration which calculates at high speed co-occurrences of luminance gradient directions at the different resolutions for an image which is an object.

BRIEF DESCRIPTION OF THE DRAWINGS

FIG. 4 are views for illustrating a calculation method.

FIG. 7 are views for illustrating operations of a gradient direction calculation unit and the like.

FIG. 9 is a view for illustrating horizontal data extension processing.

Figure 1A:
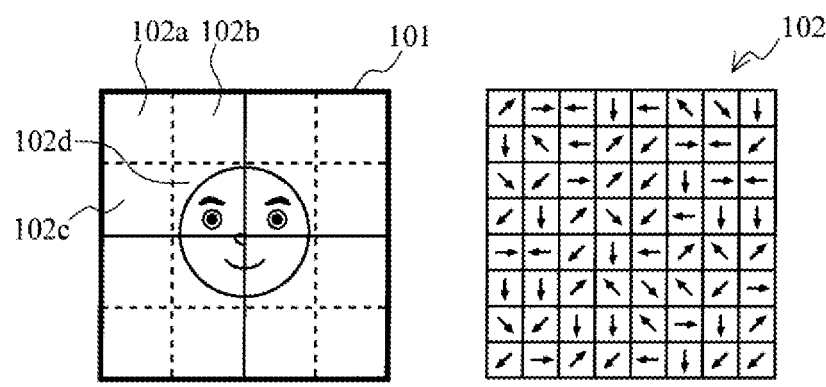
FIG. 1 are views for illustrating a concept of an HOG feature amount.

DESCRIPTION OF THE EMBODIMENTS (1) Outline of Embodiment

In an image processing device 21 (FIG. 5) are juxtaposed a high-resolution image processing line constituted of a three-line buffer 25a to a buffer 28a which extract luminance gradient directions from a high-resolution image, a medium-resolution image processing line constituted of a medium resolution unit 24b to a buffer 28b which extract luminance gradient directions from a medium-resolution image, and a low-resolution image processing line constituted of a low resolution unit 24c to a buffer 28c which extract luminance gradient directions from a low-resolution image, and the luminance gradient directions are simultaneously extracted in parallel from these images having the three resolutions in accordance with each pixel.

Co-occurrence matrix preparation units 30a, 30b, and 30c prepare co-occurrence matrices by using the luminance gradient directions extracted from these images having the three resolutions, and a histogram preparation unit 31 outputs a histogram as an MRCoHOG feature amount by using these matrices.

To concurrently processing the images having the three resolutions, high-speed processing can be performed, and moving pictures output from a camera can be processed in real time.

(2) Details of Embodiment

An HOG feature amount, a CoHOG feature amount, and an MRCoHOG feature amount will be first briefly described.

FIG. 1 are views for illustrating a concept of the HOG feature amount.

The HOG feature amount is extracted from each image in the following procedure.

An image 101 shown in a left drawing of FIG. 1(a) is determined as an image-of-interest region provided in an observation window or the like through which an object is observed.

First, the image 101 is divided into rectangular cells 102a, 120b, . . . .

Then, as shown in a right drawing of FIG. 1(a), a luminance gradient direction (a direction from a low luminance to a high luminance) of each pixel is quantized into, e.g., eight directions in accordance with each cell 102.

Figure 1B:
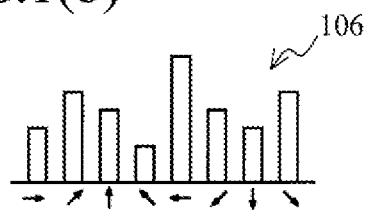

Subsequently, as shown in FIG. 1(b), the quantized luminance directions are determined as classes, a histogram using each number of appearance as a frequency is produced, and a histogram 106 of the luminance gradients included in each cell 102 is created in accordance with each cell 102.

Further, normalization is performed in such a manner that a total frequency of the histograms 106 becomes 1 in blocks each constituted of several cells 102.

In the example shown in the left drawing in FIG. 1(a), the cells 102a, 102b, 102c, and 102d form one block.

Figure 1C:

A histogram obtained by laying the thus normalized histograms 106a, 106b, . . . in a line as shown in FIG. 1(c) is an HOG feature amount 107 of the image 101.

FIG. 2 are views for illustrating the CoHOG feature amount.

The CoHOG feature amount is a feature amount paying attention to a gradient pair of two pixels in a local region, and it is extracted from an image in the following procedure.

Figure 2A:
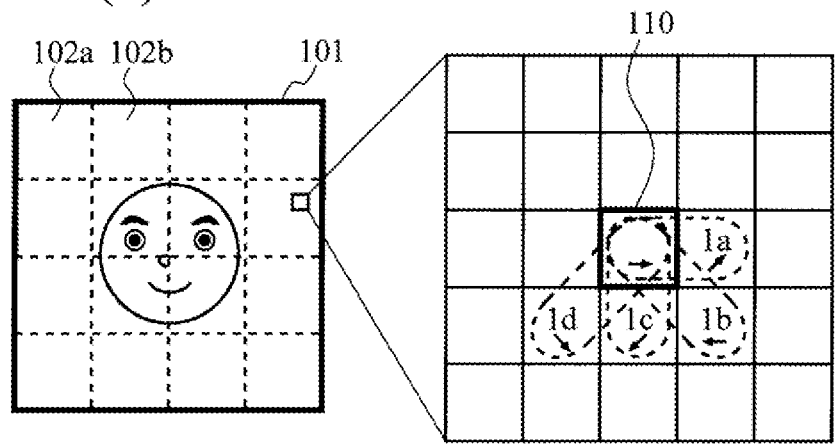
FIG. 2 are views for illustrating a concept of a CoHOG feature amount.

As shown in FIG. 2(a), an image 101 is divided into rectangular cells 102a, 102b, . . . . It is to be noted that the cells are also referred to as blocks.

As regards the CoHOG feature amount, a pixel of interest 110 is set in each of the cells 102a, 102b, . . . , and a co-occurrence matrix (a histogram concerning the pixel of interest 110) is created by using combinations of a luminance gradient direction of the pixel of interest 110 and luminance gradient directions of pixels which are away from the pixel of interest 110 by distances 1 to 4. It is to be noted that the pixels concerning the combinations with the pixel of interest 110 are called offsets.

For example, each distance from the pixel of interest 110 is represented by an expression, and applying this expression enables providing pixels 1a to 1d which are adjacent to the pixel of interest 110 as the pixels having the distance 1 as shown in FIG. 2(a).

It is to be noted that pixels on upper and left sides of the pixel of interest 110 are not included in the combinations since the pixel of interest 110 is sequentially set from a left end toward a right side in a top pixel row and processed, and hence the processing of these pixels has been already finished.

Then, luminance gradient directions of the pixel of interest 110 and the pixel 1a are observed. Each luminance gradient direction is quantized into, e.g., eight directions, and directions are indicated by arrows in the drawing.

The luminance gradient direction of the pixel of interest 110 is a right direction, and the luminance gradient direction of the pixel 1a is an upper right direction.

Figure 2B:
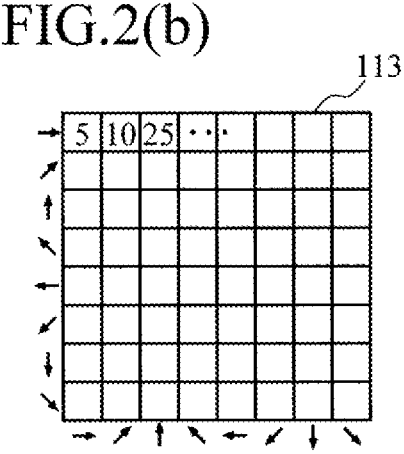

Thus, in a co-occurrence matrix 113b in FIG. 2(b), a vote is cast for each element having (a row number and a column number)=(the right direction and the upper right direction).

In the example show in FIG. 2(b), 1 is added to an element in a row having an arrow of the right direction as the row number and in a column having an arrow of the upper right direction as the column number, and a value of this element thereby becomes 10.

It is to be noted that, in a normal situation, the co-occurrence matrix 113 should be drawn as a stereoscopic histogram, and the numbers of votes should be represented by a bar graph of high directions, but the numbers of votes are represented by numeral values to simplify the drawing.

Subsequently, voting (counting) based on combinations of the pixel of interest 110 and the pixels 1b, 1c, and 1d is likewise carried out.

Figure 2C:
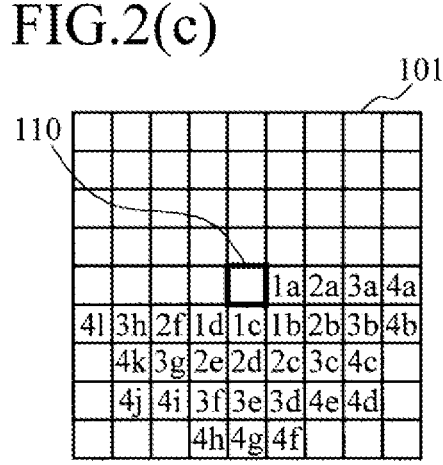

As shown in FIG. 2(c), around the pixel of interest 110, pixels having the distance 2 are defined as pixels 2a to 2f provided at an outer periphery of the pixels 1a to 1d, pixels having the distance 3 are defined as pixels 3a to 3h provided at a further outer periphery, and pixels having the distance 4 are defined as pixels 4a to 4l provided at a still further outer periphery.

Votes are likewise cast for these pixels in the combination with the pixel of interest 110 in the co-occurrence matrix 113.

The above-described voting processing is performed to all pixels constituting the cell 102, and the co-occurrence matrix for each pixel is obtained.

Figure 2D:
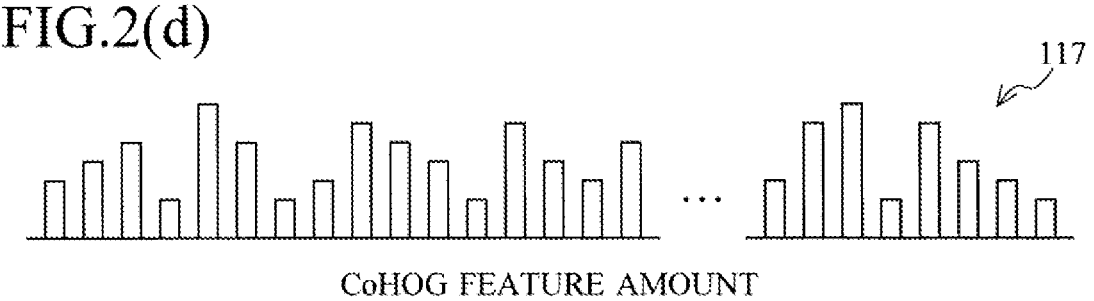

Furthermore, this processing carried out to all the cells 102, and a histogram in which components of all co-occurrence matrices are arranged in a line as shown in FIG. 2(d) is a CoHOG feature amount 117 of the image 101.

FIG. 3 are views for illustrating the MRCoHOG feature amount.

As to the MRCoHOG feature amount, the number of offsets are greatly reduced since co-occurrence is obtained at different resolutions of the same image.

Figure 3A:
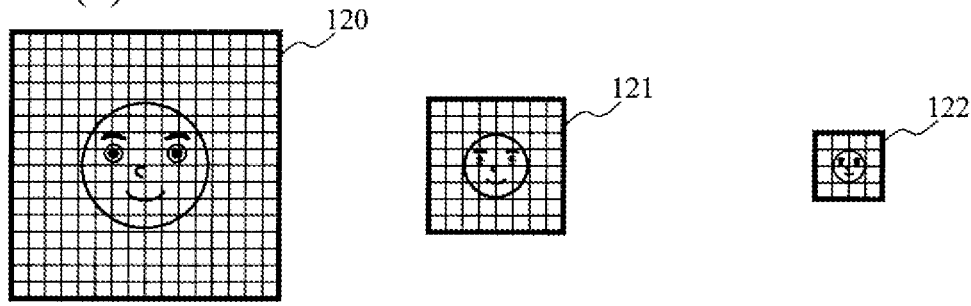
FIG. 3 are views for illustrating a concept of an MRCoHOG feature amount.

First, as shown in FIG. 3(a), images having different resolutions (image sizes) are produced from an original image, thereby providing a high-resolution image 120 (the original image), a medium-resolution image 121, and a low-resolution image 122. Each square in the images represents a pixel. Although not shown, cells (which are also referred to as blocks) are set to the respective resolution images.

Moreover, a quantized luminance gradient direction is calculated for each pixel in the high-resolution image 120, the medium-resolution image 121, and the low-resolution image 122.

Figure 3B:
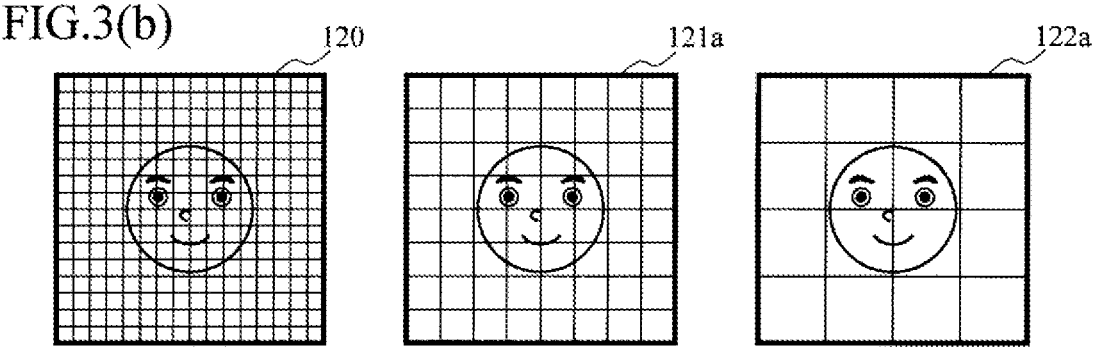

Although the medium-resolution image 121 and the low-resolution image 122 are used for extraction of the MRCoHOG feature amount, as shown in FIG. 3(b), the medium-resolution image 121 and the low-resolution image 122 are expanded to a medium-resolution image 121a and a low-resolution image 122a to be equal to the high-resolution image 120 in size for easy understanding.

Figure 3C:
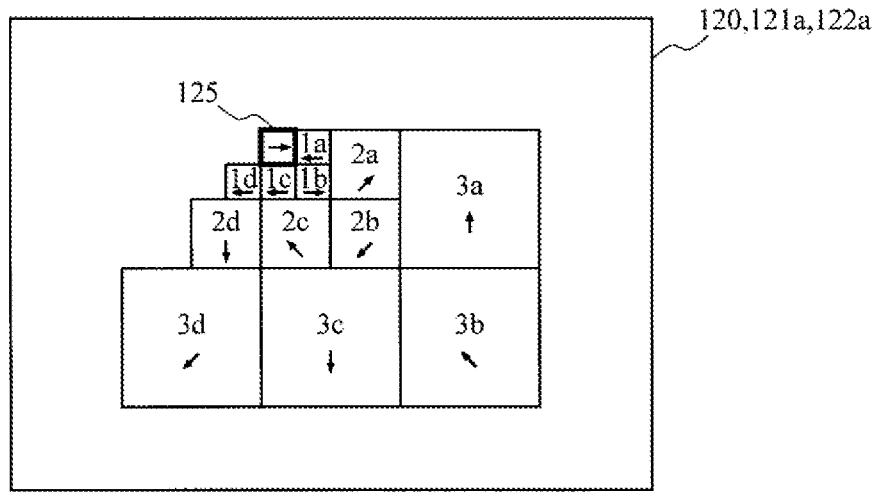

Then, as shown in FIG. 3(c), like the CoHOG feature amount, co-occurrences (combinations of luminance gradient directions) of a luminance gradient direction of a pixel of interest 125 in the high-resolution image 120 and luminance gradient directions of surrounding pixels 1a to 1d in the high-resolution image 120 are obtained, and votes are cast in a non-illustrated co-occurrence matrix.

Subsequently, votes are cast in the co-occurrence matrix in accordance with co-occurrences of the pixel of interest 125 in the high-resolution image 120 and pixels 2a to 2d in the medium-resolution image 121a provided at an outer periphery of the pixels 1a to 1d, and votes are cast in the co-occurrence matrix in accordance with co-occurrences of the pixel of interest 125 and the pixels 3a to 3d in the low-resolution image 122a which are provided at an outer periphery of the pixels 2a to 2d.

In this manner, there is provided the co-occurrence matrix in which the co-occurrences are obtained with the combinations in the high-resolution image 120, the combinations in the medium-resolution image 121a, and the combinations in the low-resolution image 122a with the pixel of interest 125 in the high-resolution image 120.

This processing is performed to each pixel in the cell of the high-resolution image 120, and it is further performed to all the cells.

Consequently, the co-occurrence matrix for each pixel in the high-resolution image 120 is provided.

Figure 3D:

Likewise, co-occurrence matrices in combination with the respective resolution images when a pixel of interest is set in the medium-resolution image 121a and co-occurrence matrices in combination with the respective resolution images when a pixel of interest is set in the low-resolution image 122a are calculated, and a histogram in which components of all the co-occurrence matrices are arranged in a line as shown in FIG. 3(d) is an MRCoHOG feature amount 127 of the high-resolution mage 120.

It is to be noted that, in this example, the histogram in which the co-occurrence matrices when the pixel of interest is set in the high-resolution image 120, the co-occurrence matrices when the pixel of interest is set in the medium-resolution image 121a, and the co-occurrence matrices when the pixel of interest is set in the low-resolution image 122a are coupled with each other is the MRCoHOG feature amount, but a histogram based on co-occurrence matrices when the pixel of interest is set in any resolution image, e.g., the high-resolution image 120 can be determined as the MRCoHOG feature amount.

Additionally, two resolution images may be combined, or the number of resolutions may be increased, and co-occurrences may be obtained in four or more solution images.

Experiments conducted by the present inventors and others have revealed that the MRCoHOG feature amount can greatly reduce a feature amount as compared with CoHOG and, on the other hand, it has better robustness than that of CoHOG.

As a reason for this, it is considered that noise is reduced by lowering a resolution and co-occurrences are observed at parts away from a pixel of interest.

A mode of an application of a mathematical calculation formula to hardware will now be described.

To calculate the MRCoHOG feature amount, a square root, a division, and an arc tangent must be calculated.

However, since computers performs various kinds of calculations such as a square root by an addition, these calculations have a considerable burden.

Thus, to increase a calculation speed or to adjust a circuit scale so that an IC chip can be formed, a calculation method suitable for hardware must be devised.

FIG. 4 are views for illustrating a calculation method used in this embodiment.

m(x, y) in Expression (1) in FIG. 4(a) represents a calculation formula of gradient intensity of a luminance gradient of a pixel which is present at a coordinate (x, y).

It is to be noted that subscript lower-case characters are represented as double-byte characters to avoid garbled characters.

Each of fx(x, y) and fy(x, y) is gradient intensity of luminance in x direction (a horizontal direction/a lateral direction) or a y direction (a vertical direction/a longitudinal direction).

Each of fx(x, y) and fy(x, y) is mathematically calculated by partially differentiating luminance in the x direction or the y direction but, in this embodiment, fx(x, y) is represented as a difference in luminance between pixels adjacently placed on both sides of a pixel of interest in the horizontal direction (a left-and-right or lateral direction), and fy(x, y) is represented as a difference in luminance between pixels adjacently placed on both sides of the pixel of interest in the vertical direction (an up-and-down or longitudinal direction).

As represented by Expression (1), the gradient intensity includes a square root, and Expression (1) is approximated by an addition expression of Expression (2) by replacing an Euclidean distance with a Manhattan distance.

In this replacement, as shown in a right drawing in FIG. 4(a), the square root (the square of t and the square of u) which is an Euclidean distance between points T and U is approximated by using t+u which is a Manhattan distance. The name Manhattan derives from that streets in Manhattan which is a city in the United States are built on a grid.

The gradient intensity is an amount which increases as a difference in luminance concerning the luminance gradient becomes large, and it is used for zero offset.

When the gradient intensity does not reach a predetermined threshold value, predetermined processing, e.g., avoiding co-occurrence is performed, but an influence on an image identification accuracy is small, and hence a description of this processing will be omitted in this embodiment.

As a result of experiments, it has been confirmed that, even if the Euclidean distance is replaced with the Manhattan distance, the image recognition capability is hardly affected.

Expression (3) in FIG. 4(b) represents a generally used calculation formula of a luminance gradient direction θ.

Since Expression (3) includes calculations of division of fy(x, y) by fx(x, y) and arctangent, a processing load required for the calculations increases.

Thus, in this embodiment, attention is focused on that the calculation of the MRCoHOG feature amount requires quantized luminance gradient directions rather than accurate values provided by Expression (3), a correspondence table in which each pair of fx(x, y) and fy(x, y) is associated with luminance gradient directions is prepared without using Expression (3), and the pair of fx(x, y) and fy(x, y) is mapped to the quantized luminance gradient directions by using this table.

FIG. 4(c) shows a relationship between a range of an angle θ and the quantized luminance gradient directions θ.

In this embodiment, for example, the luminance gradient direction is quantized into eight directions.

Here, as shown in FIG. 4(c), the luminance gradient direction θ which is 0°≤θ<45° is quantized into 0°, and the luminance gradient direction θ which is 45°≤θ<90° is quantized into 45°, and other angles are likewise quantized into 90°, 135°, 180°, 225°, 270°, and 315°.

In this technique, first, positive and negative pairs of fx(x, y) and fy(x, y) are classified into a to d in accordance with Classification 11.

Classification a corresponds to a case where both fx(x, y) and fy(x, y) are positive, Classification b corresponds to a case where both fx(x, y) and fy(x, y) are negative, Classification c corresponds to a case where fx(x, y) is positive and fy(x, y) is negative, and Classification d corresponds to a case where fx(x, y) is negative and fy(x, y) is positive.

Then, fx(x, y) is compared with fy(x, y) in magnitude, and each magnitude relation is associated with each corresponding quantized luminance gradient direction in accordance with Classification 12.

In case of Classification a, the magnitude relation is associated with 0° when y is x or less, and it is associated with 45° when y is larger than x.

In case of Classification b, the magnitude relation is associated with 90° when −y is x or less, and it is associated with 135° when the −y is larger than x.

In case of Classification c, the magnitude relation is associated with 180° when y is x or more, and it is associated with 225° when y is smaller than x.

In case of Classification d, the magnitude relation is associated with 270° when −y is x or more, and it is associated with 315° when −y is smaller than x.

As described above, in this embodiment, making reference to the correspondence table constituted of Classifications 11 and 12 enables obtaining the quantized luminance gradient directions at high speed without using the arctangent or the division.

In this manner, the image processing device according to this embodiment acquires the horizontal luminance gradient intensity fx(x, y) and the vertical luminance gradient intensity fx(x, y) of the pixel of interest by using luminance of each pixel adjacent to the pixel of interest, and outputs the quantized gradient directions by making reference to the correspondence table in which the acquired horizontal luminance gradient intensity and vertical luminance gradient intensity are associated with positive/negative and magnitude relations of the horizontal luminance gradient intensity and the vertical luminance gradient intensity and the quantized gradient directions.

Figure 5:
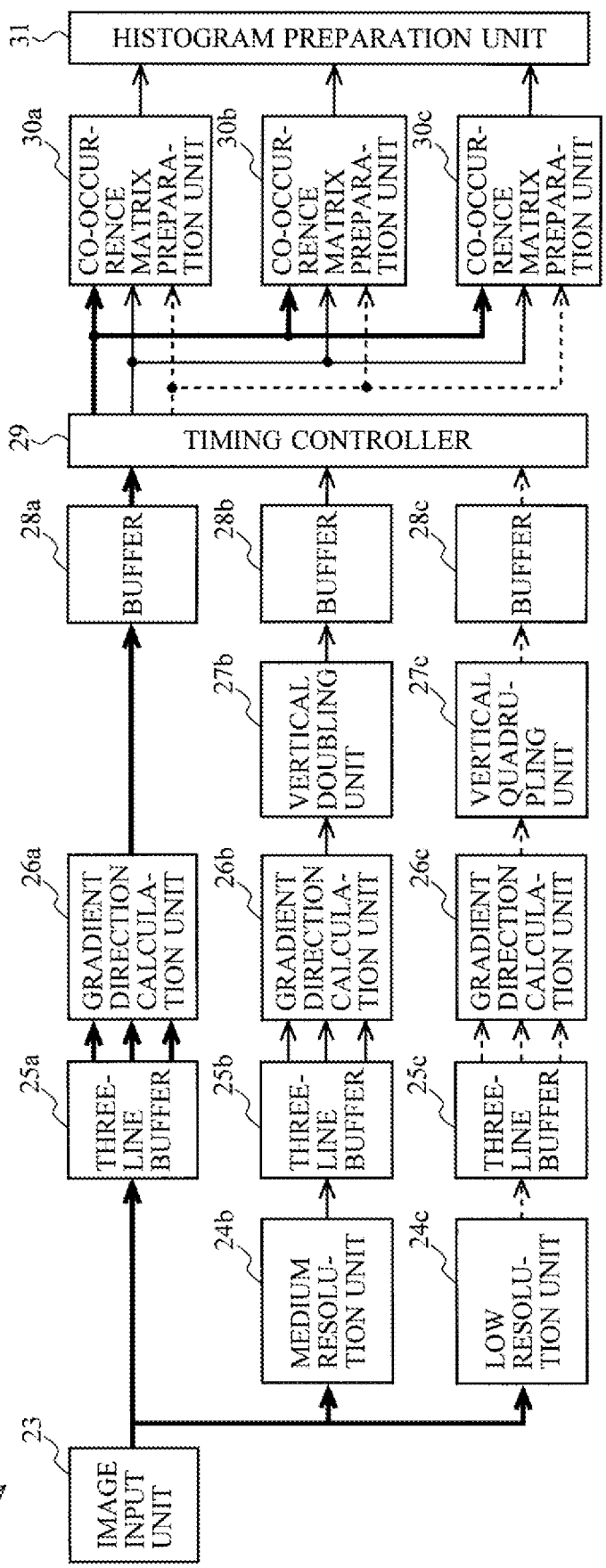
FIG. 5 is a view showing a circuit configuration of an image processing device.

FIG. 5 is a view showing a circuit configuration of an image processing device according to this embodiment.

The image processing device 21 is formed on, e.g., a semiconductor chip as a semiconductor device.

The image processing device 21 includes the high-resolution image processing line constituted of the three-line buffer 25a to the buffer 28a, the medium-resolution image processing line constituted of the medium resolution unit 24b to the buffer 28b, and the low-resolution image processing line constituted of the low resolution unit 24c to the buffer 28c.

These pipelines are arranged in parallel, and concurrently process images having high, medium, and low resolutions, thereby enabling high-speed processing.

Here, a circuit formed of a combination of the high-resolution image processing line, the medium-resolution image processing line, and the low-resolution image processing line functions as gradient direction outputting means which sequentially outputs gradient directions of luminance of respective pixels having the plurality of resolutions in accordance with each resolution by using sequentially output luminances.

Further, the high-resolution image processing line, the medium-resolution image processing line, and the low-resolution image processing line are provided in parallel in accordance with each of the plurality of resolutions, and they function as a plurality of resolution-specific gradient direction outputting means which output gradient directions of luminances in pixels having corresponding resolutions from luminances sequentially output from a later-described image input unit 23.

The image processing unit 21 operates these resolution-specific gradient direction outputting means at the same time in synchronization with clocks, and can thereby sequentially output resolution-specific gradient directions in parallel.

Each circuit constituting the image processing device 21 will now be described hereinafter.

To calculate the MRCoHOG feature amount, luminance data of each pixel constituting an image can suffice.

Thus, in this embodiment, Y (a luminance) of each pixel is extracted from an image formed in a YUYV format, and input as luminance data to the image processing device 21.

Luminance data or later-described gradient direction data of a pixel in an i-th row and a j-th column of an image will be represented as, e.g., (i-j) by using a row number and a column number of the corresponding pixel hereinafter.

The image input unit 23 is a circuit which sequentially outputs luminance data of an image in a frame transmitted from a moving picture camera in the order of pixels (the order of arranging corresponding pixels in the image), and it functions as luminance outputting means for sequentially outputting luminances of the pixels constituting the image based on the order of the corresponding pixels.

It is to be noted that, in this embodiment, luminance data Y is extracted from an image in the YUYV format in advance and input to the image input unit 23 as an image, but the image input unit 23 or gradient direction calculation units 26a, 26b, and 26c may be configured to extract luminance components from pixel data.

As shown in FIG. 7(a), an image 40 is constituted of pieces of luminance data (0-0), (0-1), (0-2), . . . , (0-n) in a first row, pieces of luminance data (1-0), (1-1), (1-2), . . . , (1-n) in a second row, and pieces of luminance data (m-0), (m-1), (m-2), . . . , (m-n) in an m-th row.

The image input unit 23 sequentially reads out the pieces of luminance data from the image 40 transmitted from the moving picture camera toward a right side from a top line, and outputs the pieces of luminance data (0-0), (0-1), (0-2), . . . , (0-n), (1-0), (1-1), . . . in the mentioned order.

Again referring to FIG. 5, output lines of the image input unit 23 are distributed to the three-line buffer 25a, the medium-resolution unit 24b, and the low-resolution unit 24c, and the luminance data output from the image input unit 23 is output to the three-line buffer 25a, the medium resolution unit 24b, and the low resolution unit 24c at the same time.

It is to be noted that, in FIG. 5, wiring lines for high-resolution luminance data are indicated by arrows of a thick line, wiring lines for medium-resolution luminance data are indicated by arrows of a thin line, and wiring lines for low-resolution luminance data are indicated by dotted lines.

Each of the medium-resolution unit 24b and the low-resolution unit 24c is a resolution conversion circuit which converts a resolution (a size) of the image 40 into ½ and ¼.

These resolution conversion circuits generate images having ½ and ¼ resolutions from the image 40.

It is to be noted that image 40 is also used as a high-resolution image as it is without changing its resolution.

As methods for converting (resizing) resolutions, there is nearest neighbor interpolation, bilinear interpolation, bicubic interpolation, and the like.

The nearest neighbor interpolation is a method which extracts pixels before resizing and uses them as they are, the bilinear interpolation is a method which weight-averages a region of 2×2 with an object pixel at the center, and the bicubic interpolation is a method which complements a region of 4×4 with an object pixel at the center by using a cubic function.

In the image processing device 21, the (later-described) nearest neighbor interpolation which uses a simple calculation and can increase a detection accuracy is adopted.

FIG. 6 are views for illustrating resolution conversion processing performed by the medium resolution unit 24b and the low resolution unit 24c.

Figure 6A:
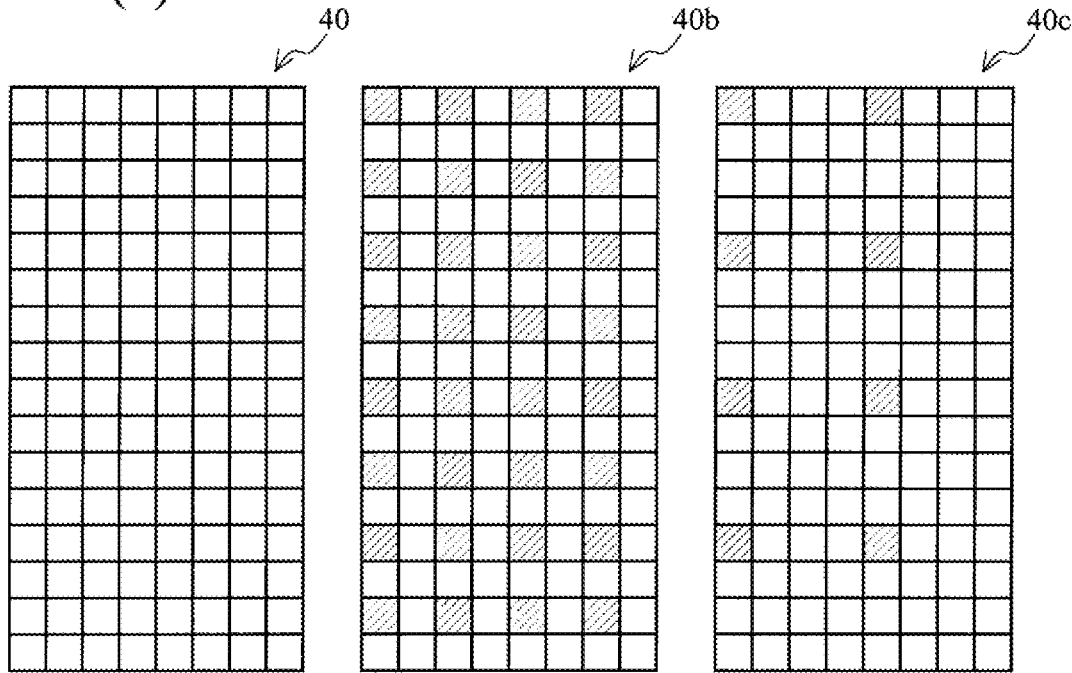
FIG. 6 are view for illustrating resolution conversion processing.

As represented by an image 40b in FIG. 6(a), the medium resolution unit 24b reads every other piece of luminance data indicated by hatched lines in the luminance data of the image 40 transmitted from the image input unit 23, skips other pieces of luminance data, and thereby generates image data having a ½ resolution in which the pieces of luminance data in the vertical line/horizontal line are alternately arranged.

As represented by an image 40c, the low resolution unit 24c reads every three pieces of luminance data indicated by hatched lines in the luminance data of the image 40 transmitted from the image input unit 23, skips other pieces of luminance data, and thereby generates image data having a ¼ resolution in which every three pieces of luminance data in the vertical direction/horizontal direction are arranged.

When the luminance data is thinned out in this manner, the medium resolution unit 24b generates/outputs a medium-resolution image having the resolution reduced to ½, and the low resolution unit 24c generates/outputs a low-resolution image having the resolution reduced to ¼.

Since the nearest neighbor interpolation is adopted, the resolution can be changed by simple processing with a small calculation burden, i.e., skipping unnecessary data and picking up necessary data.

In this manner, the image processing device 21 selects luminances sequentially output from luminance outputting means (the image input unit 23) with the use of a frequency based on a corresponding resolution, thereby sequentially outputting the luminances at the corresponding resolution.

In more detail, the high-resolution image processing line (the three-line buffer 25a to the buffer 28a) selects and outputs (luminances of) pixels with the use of a frequency based on a high resolution (the frequency corresponding to all since all pixels are selected), the medium resolution unit 24b selects and outputs (luminances of) pixels with the use of a frequency based on a medium resolution (every other pixel) in the medium-resolution image processing line (the medium resolution unit 24b to the buffer 28b), and the low resolution unit 24c selects and outputs (luminances of) pixels with the use of a frequency based a low resolution (every three pixels) in the low-resolution image processing line (the low resolution unit 24c to the buffer 28c).

These processing lines output gradient directions at each resolutions by using these pieces of luminance data.

Figure 6B:
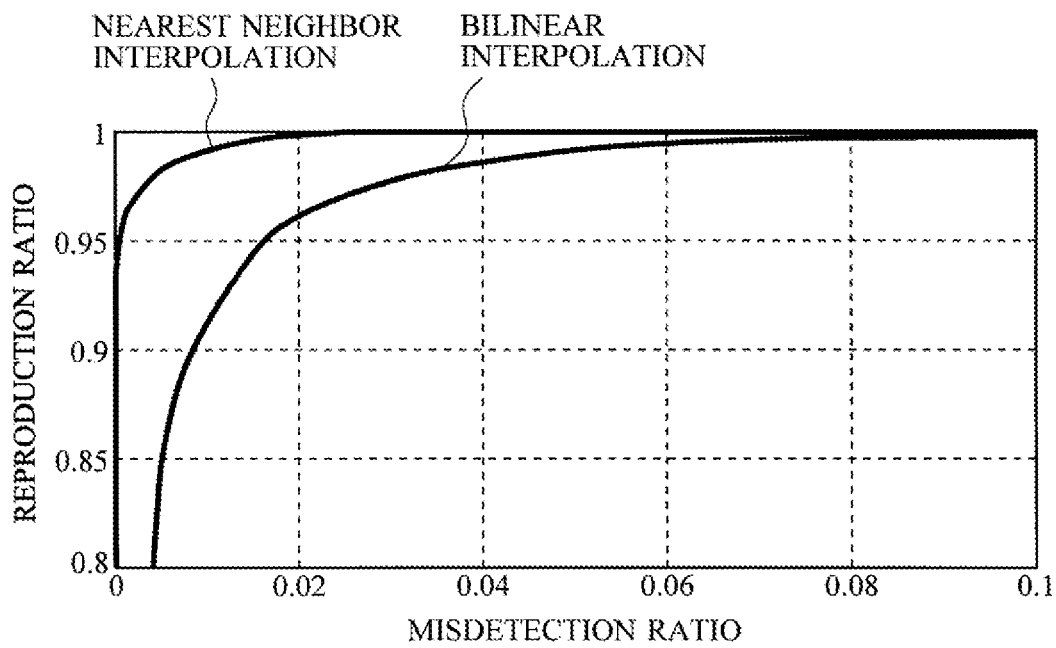

FIG. 6(b) is an ROC (Receiver Operating Characteristic) curve drawing showing experimental results of an identification ratio when the nearest neighbor interpolation is used and an identification ratio when the bilinear interpolation is used.

An axis of ordinate and an axis of abscissa represent a reproduction ratio and a misdetection ratio respectively, and show that the identification ratio becomes better as an area below curves becomes larger.

As shown in the drawing, the identification ratio when the nearest neighbor interpolation is used show overwhelmingly better performance than that of the identification ratio when the bilinear interpolation is used. An edge is clearer than that of the bilinear interpolation, and hence it can be considered that an accuracy has been improved.

As describe above, the nearest neighbor interpolation is suitable for hardware implementation since its processing is simple, and can greatly improve the identification ratio.

Again referring to FIG. 5, the three-line buffer 25a is a circuit which stores luminance data of high-resolution images and outputs pieces of data corresponding to three rows to a gradient direction calculation unit 26a in parallel.

The gradient direction calculation unit 26a is a circuit which outputs gradient direction data indicative of a luminance gradient direction of a pixel of interest in each high-resolution image by using the pieces of luminance data corresponding to three rows.

A three-line buffer 25b is a circuit which stores luminance data of medium-resolution images and outputs pieces of data corresponding to three rows to a gradient direction calculation unit 26b in parallel.

The gradient direction calculation unit 26b is a circuit which outputs gradient direction data indicative of a luminance gradient direction of a pixel of interest in each medium-resolution image by using the pieces of luminance data corresponding to three rows.

A three-line buffer 25c is a circuit which stores luminance data of low-resolution images and outputs pieces of data corresponding to three rows to a gradient direction calculation unit 26c in parallel.

The gradient direction calculation unit 26c is a circuit which outputs gradient direction data indicative of a luminance gradient direction of a pixel of interest in each low-resolution image by using the pieces of luminance data corresponding to three rows.

FIG. 7 are views for illustrating detailed operations of the three-line buffer 25a and the gradient direction calculation unit 26a.

As described above with reference to FIG. 7(a), the image input unit 23 outputs pieces of luminance data (0-0), (0-1), ... of the image 40 which is a high-resolution image.

As shown in FIG. 7(b), the three-line buffer 25a stores the pieces of luminance data corresponding to three rows in accordance with each row, and outputs these pieces of data corresponding to three rows to the gradient direction calculation unit 26a in parallel.

An example of FIG. 7(b) shows a case where pieces of luminance data (1-0), (1-1), (1-2), ... in a second row in the image 40, pieces of luminance data (2-0), (2-1), (2-2), ... in a third row in the same, and pieces of luminance data (2-0), (2-1), (2-2), ... in a fourth row in the same are output to the gradient direction calculation unit 26a while aligning columns of pixels.

The gradient direction calculation unit 26a accepts input of the pieces of luminance data corresponding to three rows output in parallel, and outputs quantized luminance gradient directions.

As shown in the drawing, the gradient direction calculation unit 26a includes an array of memory elements in three rows and three columns, fetches luminance data corresponding to three rows and three columns in synchronization with outputs from the three-line buffer 25a, and reads luminances based on these pieces of luminance data.

As shown in the drawing, the gradient direction calculation unit 26 sets a central piece of luminance data in the luminance data corresponding to three rows and three columns as a pixel of interest. In the illustrated example, the luminance data (2-1) surrounded by a rectangular of a thick line is luminance data of the pixel of interest.

Furthermore, the gradient direction calculation unit 26a calculates luminance gradient intensity fx(x, y) in the horizontal direction from a difference in luminance between the pieces of luminance data (2-2) and (2-0) which are adjacent to the pixel of interest in the horizontal direction, and calculates luminance gradient intensity fy(x, y) in the vertical direction from a difference in luminance between the pieces of luminance data (1-1) and (3-1) which are adjacent to the pixel of interest in the vertical direction.

When fx(x, y) and fx(x, y) are obtained, the gradient direction calculation unit 26a substitutes them in Expression (2) in FIG. 4 to obtain m(x, y), and performs predetermined processing if m(x, y) is yet to reach a threshold value.

If m(x, y) has reached the threshold value, fx(x, y) and fy(x, y) are looked up in the correspondence table, and the gradient direction data (2-1) representing a quantized luminance gradient direction of the corresponding pixel is output.

In this manner, the gradient direction data is generated in correspondence with the pixel like the luminance data.

With a next clock, the processing advance to a subsequent column of the luminance data and, as indicated by a gradient direction calculation unit 26a2, a subsequent piece of luminance data (2-2) becomes a pixel of interest, and the gradient direction data (2-2) is output.

In this manner, the gradient direction calculation unit 26a sequentially outputs the pieces of gradient direction data in accordance with each clock.

Further, when the last column is reached, the processing advances to a subsequent row, and the gradient direction calculation unit 26a outputs gradient direction data in which a piece of luminance data in the subsequent row is determined as a pixel of interest.

Likewise, the three-line buffer 25b and the gradient direction calculation unit 26b output the pieces of gradient direction data of medium-resolution images, and the three-line buffer 25c and the gradient direction calculation unit 26c output the pieces of gradient direction data of low-resolution images.

As described above, in the array of the storage elements in three rows and three columns arranged in the gradient direction calculation unit 26a, a position of a pixel of interest is associated with positions of adjacent pixels of this pixel, and this positional correspondence is used to sequentially identify luminance data of the pixel of interest and luminance data of the adjacent pixels in pieces of luminance data sequentially supplied in accordance with each clock.

The order of passing the position of the pixel of interest or the positions of the adjacent pixels is determined by the order of outputting the luminance data from the image input unit 23.

This is logically the same as that a window for a pixel of interest and windows for adjacent pixels are provided on a path of luminance data sequentially supplied in a bucket brigade manner and luminance data of the pixel of interest and luminance data of the adjacent pixels are identified by observation through these windows.

In the image processing device 21, since the edge processing and the circuit configuration are simple, pieces of luminance data for three rows are buffered, and they are sequentially supplied to the array of three rows and three columns, but this is just an example, and it is possible to make various modifications to identify respective pieces of luminance data of the pixel of interest and the adjacent pixels based on the output order of the image input unit 23.

Likewise, in the gradient direction calculation units 26b and 26c, the medium resolution unit 24b and the low resolution unit 24c down-sample the image 40 and identify pieces of luminance data of the pixel of interest and the adjacent pixels based on the order of outputting the luminance data, respectively.

In this manner, the resolution-specific gradient direction outputting means identifies luminance of each adjacent pixel which is adjust to the pixel of interest in the horizontal direction or the vertical direction based on the order of outputting the luminances at a corresponding resolution, and outputs a gradient direction of the pixel of interest by using the identified luminance of the adjacent pixel.

Furthermore, the resolution-specific gradient direction outputting means identifies luminance of each adjacent pixel by arranging, based on the order of outputting luminances at a corresponding resolution, each luminance in the array where a position of each adjacent pixel is associated.

Moreover, the array is constituted of three arrays corresponding to three pixel rows, i.e., a pixel row to which the pixel of interest belongs and two pixel rows adjacent to this pixel row in the vertical direction, and the resolution-specific gradient direction outputting means arranges luminances of the three pixel rows in corresponding three arrays, and identifies the luminance of each adjacent pixel based on positions at which the luminances are arranged.

Again referring to FIG. 5, each of a vertical direction doubling unit 27b and a vertical direction quadrupling unit 27c is a circuit which vertically doubles or quadruples vertical gradient direction data of a medium-resolution image or a low-resolution image.

This processing is performed to match a timing of reading co-occurrences in a co-occurrence matrix preparation unit 30a or the like at a later step.

Figure 8:
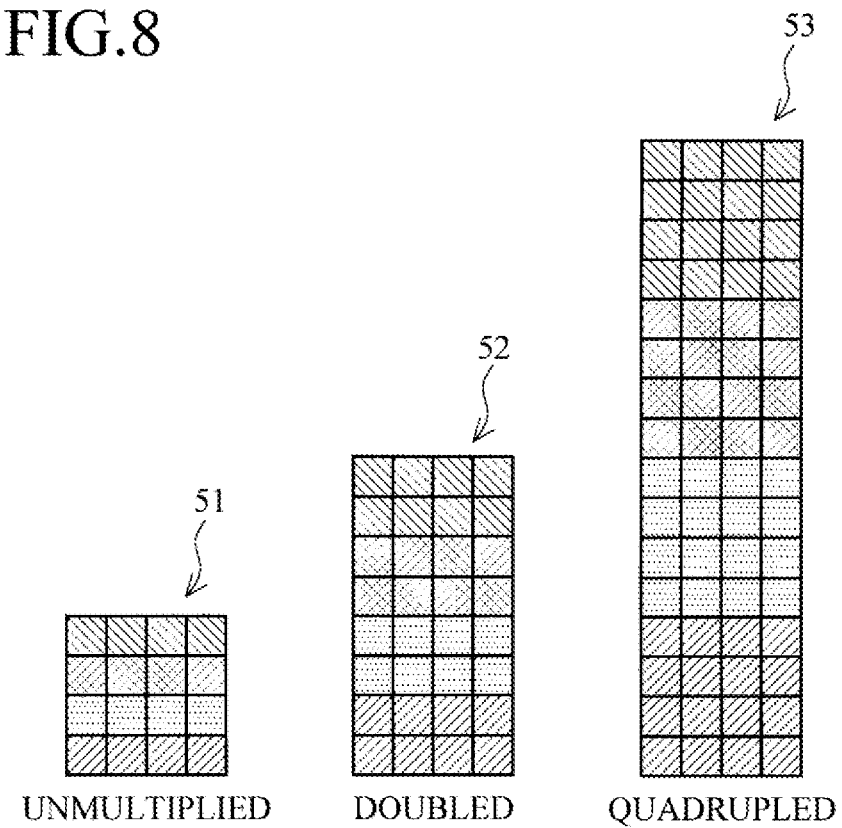
FIG. 8 is a view for illustrating vertical data extension processing.

FIG. 8 are views for illustrating vertical data expansion processing.

Data 51 represents a configuration of gradient direction data before data expansion. Each square represents each piece of gradient direction data, and these pieces of data are aligned in the order of corresponding pixels.

When each row of the data 51 is duplicated and each duplicated row is arranged to be adjacent to an original row, data 52 doubled in the vertical direction and data 53 quadrupled in the same direction are provided.

With this technique, the vertical doubling unit 27b duplicates the gradient direction data of a medium-resolution image output from the gradient direction calculation unit 26b in accordance with each row, and doubles each duplicated data in the longitudinal direction (the vertical direction).

Additionally, the vertical quadrupling unit 27c duplicates the gradient direction data of a low-resolution image output from the gradient direction calculation unit 26c, and quadruples each duplicated data in the longitudinal direction.

Again referring to FIG. 5, the buffers 28a, 28b, and 28c are buffers which temporarily store gradient direction data of high-resolution images, gradient direction data of medium-resolution images, and gradient direction data of low-resolution images output from the gradient direction calculation unit 26a, the vertical doubling unit 27b, and the vertical quadrupling unit 27c, respectively.

A timing controller 29 is a control circuit which controls timings to supply pieces of gradient direction data of high-resolution images, medium-resolution images, and low-resolution images to the co-occurrence matrix preparation units 30a, 30b, and 30c.

The timing controller 29 stands by until these pieces of gradient direction data of the respective resolution images are prepared in the buffers 28a, 28b, and 28c, and outputs them when these pieces of data are all prepared.

Consequently, the output timings for the respective resolution images deviated due to a change in resolution can be aligned.

The pieces of gradient direction data of the respective resolution images are output from different wiring lines as indicated by thick lines for the gradient direction data of the high-resolution images, thin lines for the gradient direction data of the medium-resolution images, and dotted lines for the gradient direction data for the low-resolution images in the drawing.

These wiring lines are connected with the co-occurrence matrix preparation units 30a, 30b, and 30c respectively, and the pieces of gradient direction data of the respective resolution images are transmitted to the co-occurrence matrix preparation units 30a, 30b, and 30c.

Further, to match the timings of taking co-occurrences by the co-occurrence matrix preparation units 30a, 30b, and 30c, the timing controller 29 horizontally (laterally) doubles and quadruples the pieces of gradient direction data of the medium-resolution image and the low-resolution image, respectively.

FIG. 9 is a view for illustrating the data expansion processing in the horizontal direction.

Data columns 55, 56, and 57 represent timings at which the timing controller 29 outputs pieces of gradient direction data of a high-resolution image, a medium-resolution image, and a low-resolution image, respectively.

For example, as indicated by the data column 55, the timing controller 29 sequentially outputs a first piece of data to a 30th piece of data in the pieces of gradient direction data of the high-resolution image one by one.

On the other hand, in regard to the pieces of gradient direction data of the medium-resolution image, as indicated by the data column 56, a first piece of data is output once, each of a second piece of data to a 15th piece of data is output twice, and a 16th piece of data is output once in accordance with the output timings for the high-resolution.

Further, in regard to the pieces of gradient direction data of the low-resolution image, as indicated by the data column 57, a first piece of data is output three times, each of a second piece of data to a seventh piece of data is output four times, and an eighth piece of data is output three times in accordance with the output timings for the high resolution.

It is to be noted that the numbers of times of output at the top and the end of each of the data column 55 and the data column 56 are not two times and four times since widths of these data columns must be adjusted to be equal to a width of the data column 55.

Consequently, the pieces of gradient direction data of the medium-resolution image and the low-resolution image are horizontally doubled and quadrupled, respectively.

Again referring to FIG. 5, each of the co-occurrence matrix preparation units 30a, 30b, and 30c is a circuit which conducts voting based on co-occurrences with the use of gradient direction data output from the timing controller 29 to prepare a co-occurrence matrix.

Each of the co-occurrence matrix preparation units 30a, 30b, and 30c prepares a co-occurrence matrix in which a pixel in a high-resolution image, a medium-resolution image, or a low-resolution image is determined as a pixel of interest.

The histogram preparation unit 31 is a circuit which prepares an MRCoHOG feature amount from the co-occurrence matrices output from the co-occurrence matrix preparation units 30a, 30b, and 30c.

It is to be noted that, in case of forming the image processing device 21 as an IC chip, the histogram preparation unit 31 may be configured as an external circuit without being incorporated in the image processing device 21 so that the IC chip can be connected with the histogram preparation unit 31.

Consequently, more flexible operations, e.g., selecting the co-occurrence matrices output from the co-occurrence matrix preparation units 30a, 30b, and 30c can be performed, thus improving general versatility.

Figure 10:
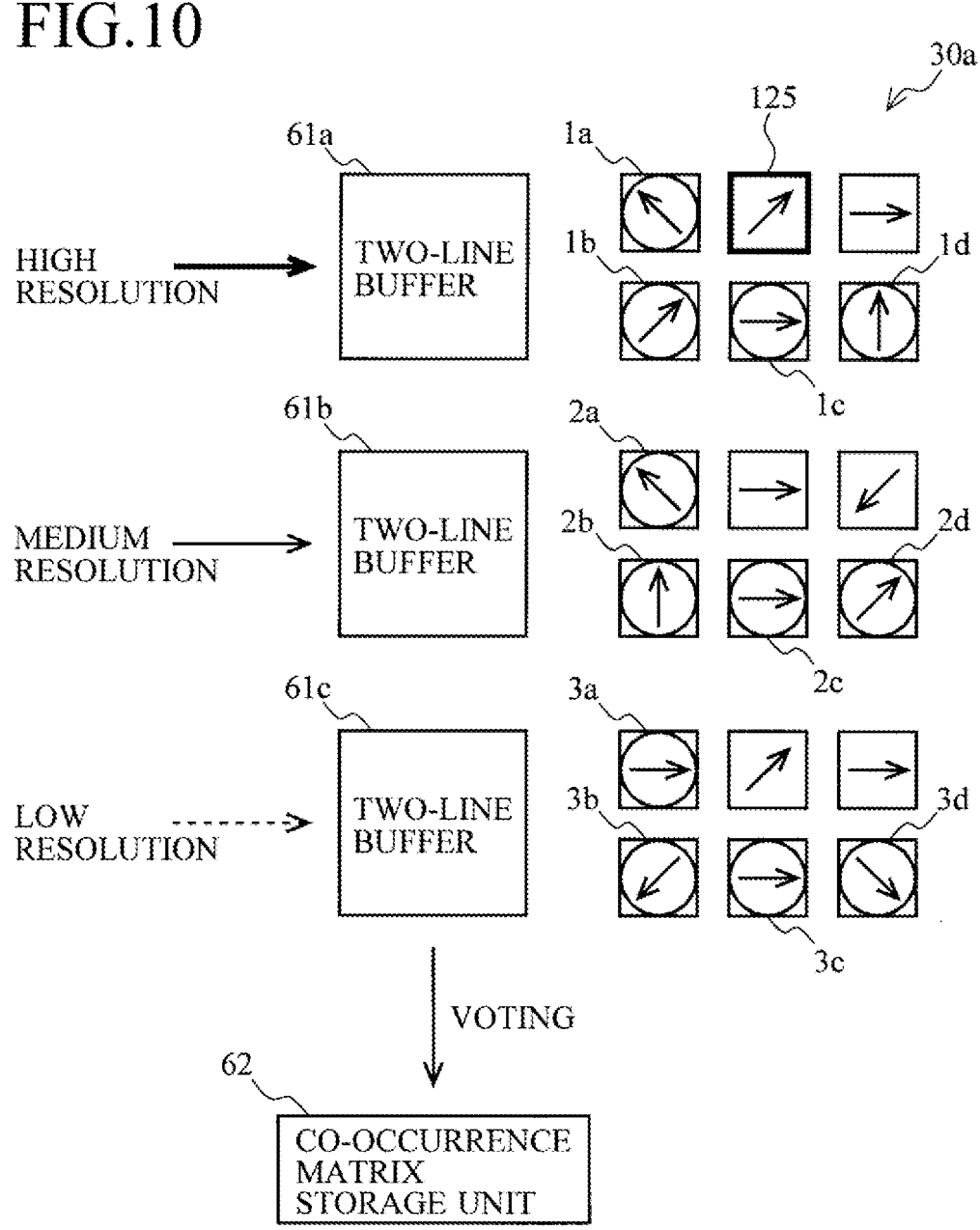
FIG. 10 is a view for illustrating a mechanism of calculating co-occurrence matrices.

FIG. 10 is a view for illustrating a mechanism of calculating a co-occurrence matrix by the co-occurrence matrix preparation unit 30a.

The co-occurrence matrix preparation unit 30a includes a two-line buffer 61a for high-resolution images, a two-line buffer 61b for medium-resolution images, and a two-line buffer 61c for low-resolution images each of which stores each piece of gradient data transmitted from the timing controller 29 in two rows in accordance with each resolution.

On the right side of each of the two-line buffers 61a, 61b, and 61c, arrangement of pieces of gradient direction data stored in the two-line buffer 61a, 61b, or 61c is shown.

Signs indicative of positions of the gradient direction data correspond to signs of positions in FIG. 3(c) (they do not correspond to gradient directions). Furthermore, the gradient direction data corresponding to a pixel of interest is surrounded by a rectangle of a thick line, and the gradient direction data of each of other pixels combined with the pixel of interest for voting is surrounded by a circle.

As shown in the drawing, in each of the two-line buffers 61a, 61b, and 61c, the pieces of gradient direction data of the high-resolution image, the medium-resolution image, or the high-resolution image are arranged in two rows and three columns.

It is to be noted that, to arrange pieces of luminance data in the order of outputting them from the image input unit 23, the arrangement in each of the two-line buffers 61a, 61b, and 61c is laterally inverted from FIG. 3(c).

A co-occurrence matrix storage unit 62 is a circuit which accepts voting based on co-occurrences and prepares a co-occurrence matrix for a pixel of interest 125 by incrementing frequencies (the number of votes) of co-occurrence matrices.

First, the co-occurrence matrix preparation unit 30a conducts voting in the co-occurrence matrix storage unit 62 based on combinations of gradient direction data of the pixel of interest 125 and gradient direction data of pixels 1a t 1d.

Moreover, the co-occurrence matrix preparation unit 30a conducts voting in the co-occurrence matrix storage unit 62 based on combinations of the gradient direction data of the pixel of interest 125 and gradient direction data of pixels 2a to 2d, and conducts voting in the co-occurrence matrix storage unit 62 based on combinations of the gradient direction data of the pixel of interest 125 and gradient direction data of pixels 3a to 3d.

Upon completing the voting of the pixel of interest 125, the co-occurrence matrix preparation unit 30a outputs data to the histogram preparation unit 31, resets the co-occurrence matrices to 0 vote, and advances the columns of the gradient direction data stored in the two-line buffers 61a, 61b, and 61c by one.

Consequently, the co-occurrence matrix preparation unit 30a arranges the gradient direction data corresponding to the pixel 1a at a position of the pixel of interest 125, and conducts voting using this arrangement with respect to the co-occurrence matrix storage unit 62.

The co-occurrence matrix preparation unit 30a brings the co-occurrence matrices for the respective pixels in the high-resolution image to completion in the co-occurrence matrix storage unit 62 by repeating the above-described operation, and outputs them to the histogram preparation unit 31.

Histograms based on the output co-occurrence matrices are coupled with each other in the histogram preparation unit 31, and turned to an MRCoHOG feature amount in a case where the pixel in the high-resolution image is determined as the pixel of interest.

Again referring to FIG. 5, like the co-occurrence matrix preparation unit 30a, the co-occurrence matrix preparation units 30b and 30c output co-occurrence matrices in a case where a pixel in a medium-resolution image is determined as the pixel of interest and co-occurrence matrices in a case where a pixel in a low-resolution image is determined as the pixel of interest, respectively.

Consequently, an MRCoHOG feature amount when the pixel in the medium-resolution image is determined as the pixel of interest and an MRCoHOG feature amount when the pixel in the low-resolution image is determined as the pixel of interest are provided, and the histogram preparation unit 31 couples these three MRCoHOG feature amounts of the high, medium, and low-resolution images with each other to bring the MRCoHOG feature amount to completion.

The image processing device 21 is configured as described above, and the respective circuits simultaneously operate in synchronization with clocks and sequentially carry out processing in an assembly line system.

In this manner, images output from the moving picture camera can be processed in real time.

As described above, the co-occurrence matrix preparation units 30a, 30b, and 30c function as co-occurrence matrix preparing means which prepare co-occurrence matrices based on co-occurrences of gradient directions at different resolutions by sequentially combining gradient directions for each of resolutions which are output in series, and co-occurrence matrix outputting means which output the prepared co-occurrence matrices as image feature amounts of the image.

The co-occurrence matrix preparation units 30a, 30b, and 30c sequentially identify a gradient direction of a pixel of interest and gradient directions of pixels combined with the pixel of interest based on the resolution-specific output order of gradient directions sequentially output from the gradient direction outputting means to identify combinations which take co-occurrences by sequentially arranging pieces of gradient direction data in the two-line buffers 61a, 61b, and 61c upon output of these pieces of data, and sequentially conduct voting in co-occurrence matrices based on the identified combinations of the gradient directions, thus preparing the co-occurrence matrices.

Additionally, since the two-line buffers 61a, 61b, and 61c function as the arrays which identify pieces of gradient direction data which are co-occurrence targets, the co-occurrence matrix preparation units 30a, 30b, and 30c arrange the gradient directions in accordance with each resolution in the arrays, in which the pixel of interest is associated with positions of pixels combined with the pixel of interest and which are provided (divided) in accordance with each resolution, based on the resolution-specific output order, thereby identifying the gradient directions combined as the co-occurrence targets.

Further, the arrays are formed of six arrays corresponding to pixel rows each pair of which are vertically adjacent to each other for each resolution (a total of six arrays, i.e., two buffers for high-resolution images, two buffers for medium-resolution images, and two buffers for low-resolution images), and each of the co-occurrence matrix preparation units 30a, 30b, and 30c arranges the gradient directions of the two pixel rows for each resolution in the corresponding two arrays and identifies the gradient directions to be combined based on positions at which the gradient directions are arranged.

Figure 11:
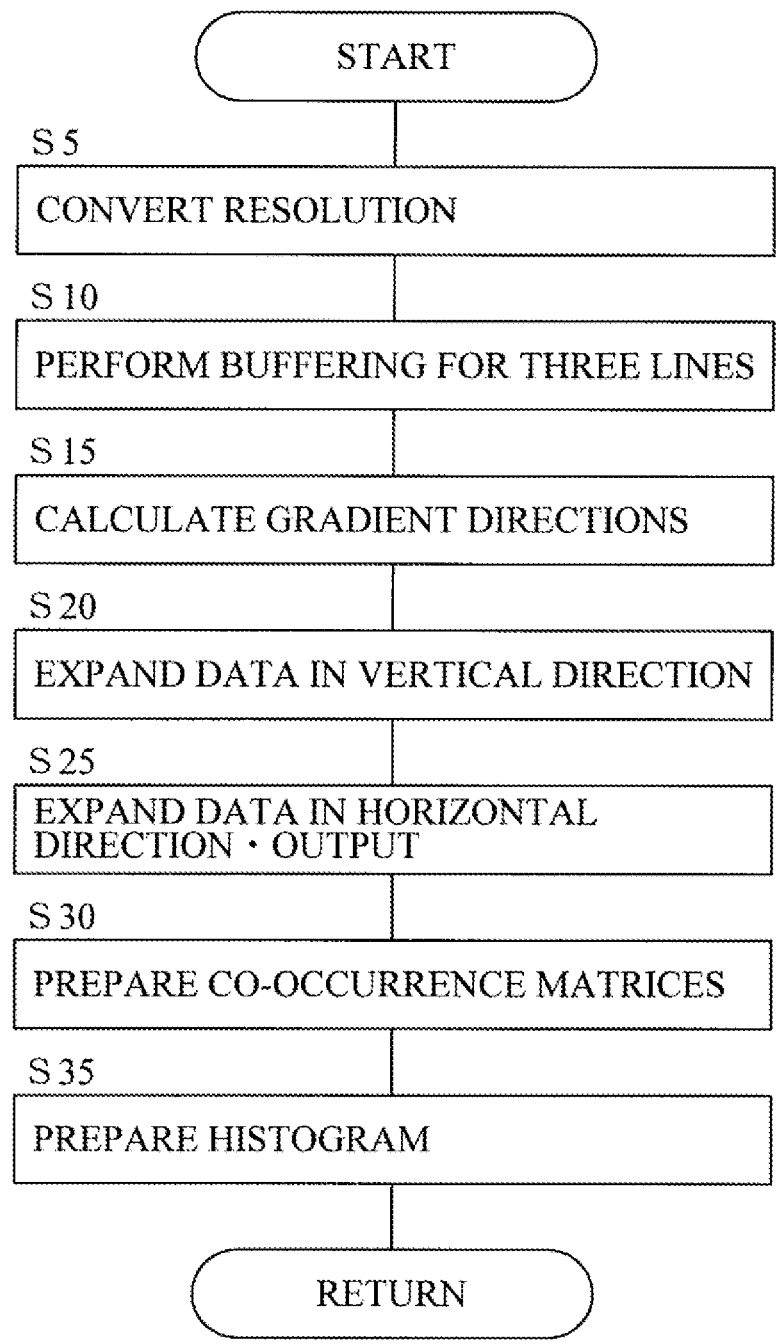
FIG. 11 is a flowchart for illustrating an image processing procedure.

FIG. 11 is a flowchart for illustrating an image processing procedure performed by the image processing device 21.

First, the image input unit 23 outputs luminance data of the image 40, and the medium resolution unit 24b and the low resolution unit 24c output luminance data provided by converting a resolution into a medium resolution and a low resolution (a step 5).

Furthermore, each of the three-line buffers 25a, 25b, and 25c buffers the luminance data of a high-resolution image, a medium-resolution image, or a low-resolution image for three lines (a step 10).

Moreover, each of the gradient direction calculation units 26a, 26b, and 26c calculates gradient directions of pixels in the high-resolution image, the medium-resolution image, or the low-resolution image, and outputs gradient direction data (a step 15).

It is to be noted that the respective pieces of processing of the steps 5, 10, and 15 are simultaneously performed in parallel.

Then, the vertical doubling unit 27b and the vertical quadrupling unit 27c vertically double and quadruple the pieces of gradient direction data of the medium-resolution image and the low-resolution image, respectively (a step 20).

The gradient direction data of the high-resolution image, the vertically doubled gradient direction data of the medium-resolution image, and the vertically quadrupled gradient direction data of the low-resolution image are buffered in the buffers 28a, 28b, and 28c, respectively.

Then, the timing controller 29 matches timings and outputs the gradient direction data for each resolution.

At this time, the timing controller 29 horizontally doubles and quadruples the pieces of gradient direction data of the medium-resolution image and the low-resolution image and outputs them, respectively (a step 25).

The co-occurrence matrix preparation units 30a, 30b, and 30c calculate elements in co-occurrence matrices and prepare the co-occurrence matrices by using the gradient direction data for each resolution output from the timing controller 29 (a step 30).

Additionally, the histogram preparation unit 31 prepares a histogram from the prepared co-occurrence matrices, and outputs it as an MRCoHOG feature amount (a step 35).

Although the operations of the respective circuits have been individually described above, the respective circuits concurrently operate in synchronization with clocks and simultaneously perform an assembly-line operation of sequentially (successively) processing data fed from the left side and supplying it to the right side.

Figure 12A:
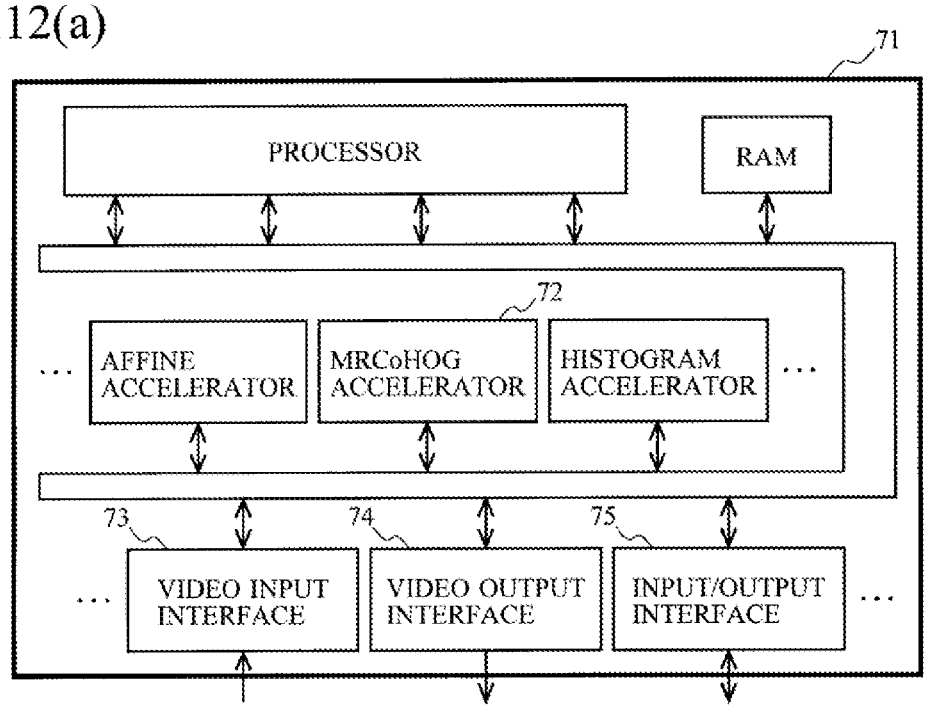
FIG. 12 are views showing a structural example of a semiconductor device.

FIG. 12(a) is a view showing an example where a semiconductor device is configured by using the image processing device 21.

A semiconductor device 71 is constituted of, e.g., an IC chip, and a processor, an RAM, an MRCoHOG accelerator 72, an affine accelerator, a histogram accelerator, a video input interface 73, a video output interface 74, an input/output interface 75, and the like are formed in this device.

The MRCoHOG accelerator 72 has a circuit configuration of the image processing device 21 incorporated therein, produces co-occurrence matrices from images, and outputs them. Alternatively, it may be also configured to prepare histograms and extract MRCoHOG feature amounts.

The semiconductor device 71 can accept input of moving picture image from the video input interface 73, extract an MRCoHOG feature amount of each frame image by using the MRCoHOG accelerator 72 and the like, and perform object image recognition in a processor with the use of the extracted feature amount.

Alternatively, it may output moving picture data from the video output interface 74, output the MRCoHOG feature amount from the input/output interface 75, and perform object image recognition in an external device.

Figure 12B:
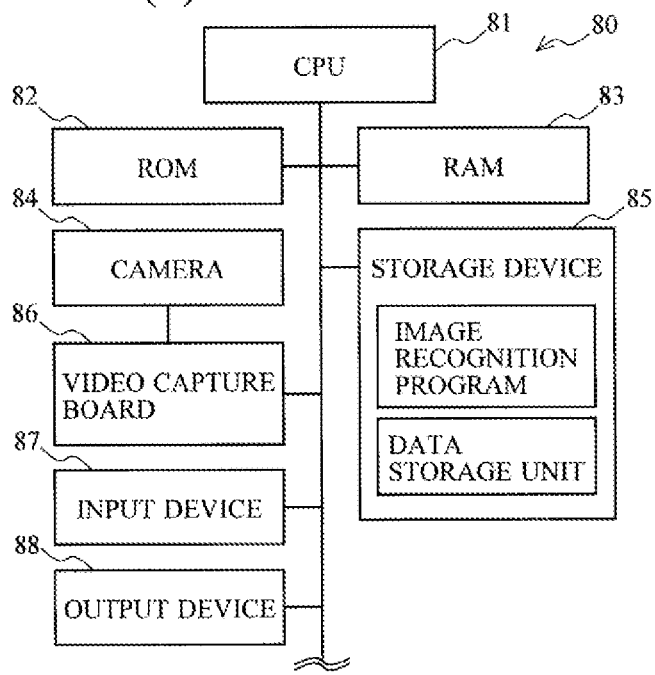

FIG. 12(b) is a view showing an example where the semiconductor device 71 is mounted on a video capture board and a computer is equipped with this device to constitute an image recognition device.

An image recognition device 80 is constituted of a CPU (Central Processing Unit) 81, an ROM (Read Only Memory) 82, an RAM (Random Access Memory) 83, a camera 84, a storage device 85, a video capture board 86, an input device 87, an output device 88, and the like.

The CPU 81 performs image recognition processing in accordance with an image recognition program stored in the storage device 85, and also performs control over respective units in the image recognition device 80.

In more detail, the CPU 81 recognize an object image by using the image input from the video capture board 86 and an MRCoHOG feature amount of the image.

The ROM 82 is a read only memory which stores basic programs, parameters, and the like required for the CPU 81 to operate the image recognition device 80.

The RAM 83 is a readable/writable memory which provides a working memory required for the CPU 81 to perform the processing.

Images or MRCoHOG feature amounts are developed in the RAM 83 and used by the CPU 81.

The camera 84 is a moving picture photographing camera, and it takes moving pictures of a subject and outputs this video to the video capture board 86. The video is constituted of images of continuous frames.

The video capture board 86 extracts MRCoHOG feature amounts of respective images constituting the video, and outputs them in correspondence with image data.

The storage device 85 is, e.g., a storage device using a storage medium such as a hard disk or a semiconductor memory, and stores an image recognition programs and the like required for the CPU 81 to perform the image recognition processing.

Further, the storage device 85 also includes a data storage unit which stores captured moving picture data.

The input device 87 is a device which inputs various kinds of information to the image recognition device 80, and it is constituted of input devices such as operation buttons required for a user to operate the image recognition device 80.

The output device 88 is a device from which the image recognition device 80 outputs various kinds of information, and it is constituted of output devices such as a liquid crystal display which displays operation screens or moving pictures which are being captured or have been already captured.

Figure 12C:
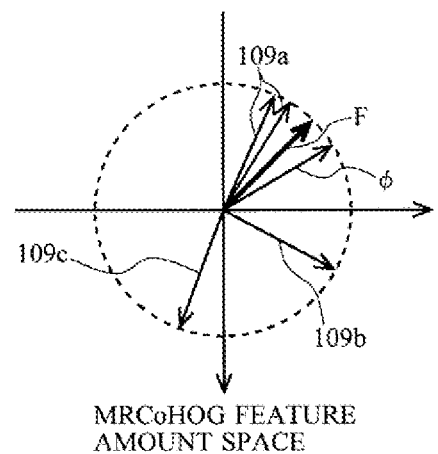

FIG. 12(c) is a view for illustrating an image recognition processing method using MRCoHOG feature amounts performed by image recognition device 80.

First, a vector $\phi(x)$ whose component is a frequency (which is determined as M) of an MRCoHOG feature amount is considered. Here, x is a vector representing an image, and x=(a luminance of a first pixel, a luminance of a second pixel, . . . ) is provided.

It is to be noted that the vector is indicated by bold face or the like, but it will be indicated by normal face hereinafter to avoid garbled characters.

This drawing shows an MRCoHOG feature amount space, and the MRCoHOG feature amount of an image is mapped to the vector $\phi(x)$ in an M-dimensional space.

It is to be noted that the MRCoHOG feature amount is represented in a two-dimensional space in the drawing for simplification.

On the other hand, F is a weight vector obtained by learning an object image, and is also a vector obtained by averaging MRCoHOG feature amount of many object images.

$\phi(x)$ is distributed around F like vectors 109a when the image is similar to a learned image, or it is distributed in directions different from F like vectors 109b and 109c.

F and $\phi(x)$ are standardized, and a correlative relationship defined by an inner product of F and $\phi(x)$ approximates 1 as the image becomes more similar to the learned image, or it approximate −1 as a similarity level becomes lower.

In this manner, mapping an image which is an object of similarity determination to an MRCoHOG feature amount space enables separating an image which is similar to a learned image from an image which is not similar to the same with the use of a luminance gradient distribution.

Consequently, the object image can be recognized.

As described above, the image recognition device 80 includes recognizing means for recognizing an object which is shown in an image by comparing the vector $\phi(x)$ of a histogram output from the image processing device 21 with the vector F of a histogram of a reference image.

Next, an example where the image recognition device 80 is mounted in a mobile body will now be illustrated.

The semiconductor device 71 can perform the image processing in real time, and hence it is suitable to be mounted in a mobile body which requires real-time processing.

For example, when the mobile body is a vehicle, the camera 84 is installed in a front part of the vehicle to photograph a front view of the vehicle.

Consequently, the vehicle tracks another vehicle traveling ahead from a video of the camera 84, and hence it follows this vehicle traveling ahead to perform so-called traveling in convoy, or it puts on the brakes or changes a traveling direction to effect an avoidance operation when a collision risk is determined from a tracking trajectory of a vehicle or a pedestrian moving ahead. In this manner, the image recognition device 80 can be applied to an autonomous driving technology or other technologies.

Further, when the mobile body is a robot, the device can be used as an eye of the robot so that, for example, services can be provided at home (e.g., the device carries luggage and follows a master), a moving object can be held by a robot arm while following it, or livestock can be guided while being followed, thereby enabling use in varies fields such as a consumer field, an industrial field, an agricultural field, and others.

As described above, in this embodiment, it is possible to provide a mobile body device including detecting means for detecting a target by using the image recognition device 80, and moving means for moving to a predetermined position for a detection target.

To form an MRCoHOG algorithm as an IC chip or port the same to an FPGA (field-programmable gate array) board, high-speed processing must be enabled, and the optimization design must be carried out without lowering an accuracy.

In the image processing device 21, as an interpolation method for the multi-resolution image generation processing using MRCoHOG feature amounts, the high-speed nearest neighbor interpolation which can provide clear edges of object boundaries has been adopted. A thinning interval in each memory is set in accordance with each size of an image to be generated, and the image is generated based on the nearest neighbor interpolation by thinning.

The image processing device 21 was designed and manufactured by students as a research task, and performance which sufficiently enables real-time processing was realized.

Thus, if companies having financial resources and accumulation of technologies manufacture this device, it can be expected that the speed can be further increased, and hence calculation resources of computers can be distributed to other processing.

EXPLANATIONS OF LETTERS OR NUMERALS

1a-41 pixel
11, 12 classification
21 image processing device
23 image input unit
24b medium resolution unit
24c low resolution unit
25a, 25b, 25c three-line buffer
26a, 26b, 26c gradient direction calculation unit
27b vertical doubling unit
27c vertical quadrupling unit
28a, 28b, 28c buffer
29 timing controller
30a, 30b, 30c co-occurrence matrix preparation unit
31 histogram preparation unit
40 image
51, 52, 53 data
55, 56, 57 data column
61a, 61b, 61c two-line buffer
62 co-occurrence matrix storage unit
71 semiconductor device
72 MRCoHOG accelerator
73 video input interface
74 video output interface
75 input/output interface
80 image recognition device
81 CPU
82 ROM
83 RAM
84 camera
85 storage device
86 video capture board
87 input device
88 output device
101 image
102 cell
106 histogram
107 HOG feature amount
109a, 109b, 109c vector
110 pixel of interest
113 co-occurrence matrix
117 CoHOG feature amount
120 high-resolution image
121 medium-resolution image
122 low-resolution image
125 pixel of interest
127 MRCoHOG feature amount

The invention claimed is:

1. An image processing device comprising:
   means for producing a first image having a first resolution and a second image having a same image content as the first image at a second resolution lower than the first resolution, based on an input image;
   luminance outputting means for sequentially outputting luminances of pixels constituting the first and second images based on an order of pixels;
   gradient direction outputting means for sequentially outputting gradient directions of luminances of respective pixels of the first and second images in parallel by using the sequentially output luminances, the gradient direction outputting means comprising:
      a first resolution-specific gradient direction outputting means that outputs gradient directions of luminances of the pixels of the first image at the first resolution; and
      a second resolution-specific gradient direction outputting means parallel to the first resolution-specific gradient direction outputting means, the second resolution-specific gradient direction outputting means outputting gradient directions of luminances of the pixels of the second image at the second resolution, the first and second resolution-specific gradient direction outputting means being concurrently operated to sequentially output the gradient directions for each of the first and second images in parallel;
   a timing controller for controlling timings to supply pieces of gradient directions of luminances of the first and second images to a co-occurrence matrix preparing means for preparing a co-occurrence matrix including co-occurrences of the gradient directions occurring in both the first and second images by sequentially combining the sequentially output gradient directions for each of the first and second images; and
   co-occurrence matrix outputting means for outputting the prepared co-occurrence matrix as an image feature amount of the input image.

2. The image processing device according to claim 1, wherein each of the first and second resolution-specific gradient direction outputting means:
   selects the luminances sequentially output from the luminance outputting means by using a frequency based on a corresponding first or second resolution to sequentially output the luminances at the corresponding first or second resolution, and
   outputs gradient directions at the corresponding first or second resolution by using the output luminances.

3. The image processing device according to claim 1, wherein each of the first and second resolution-specific gradient direction outputting means:
   identifies luminances of adjacent pixels which are horizontally and vertically adjacent to a pixel of interest based on an order of outputting the luminances at the corresponding first or second resolution, and
   outputs a gradient direction of the pixel of interest by using the identified luminances of the adjacent pixels.

4. The image processing device according to claim 3, wherein each of the first and second resolution-specific gradient direction outputting means:
   acquires horizontal luminance gradient intensity and a vertical luminance gradient intensity of the pixel of interest by using the identified luminances of the adjacent pixels, and
   outputs quantized gradient directions by making reference to a correspondence table, in which positive and negative and magnitudes of horizontal luminance gradient intensity and vertical luminance gradient intensity are associated with the quantized gradient directions, as to the acquired horizontal luminance gradient intensity and vertical luminance gradient intensity.

5. The image processing device according to claim 3, wherein each of the first and second resolution-specific gradient direction outputting means identifies the luminances of the adjacent pixels by arranging the luminances in an array where positions of the adjacent pixels are associated based on the order of outputting the luminances at the corresponding resolution.

6. The image processing device according to claim 5, wherein the array is constituted of three arrays corresponding to a pixel row to which the pixel of interest belongs and two pixel rows which are vertically adjacent to the pixel row, and
each of the first and second resolution-specific gradient direction outputting means arranges luminances of the three pixel rows in the corresponding three arrays, and identifies the luminances of the adjacent pixels based on positions at which the luminances are arranged.

7. A semiconductor device comprising:
the image processing device according to claim 1 mounted therein.

8. An image recognition device comprising:
the image processing device according to claim 1; and
recognizing means for comparing a histogram based on a co-occurrence matrix output from the image processing device with a histogram based on a co-occurrence matrix of a reference image to recognize an object shown in the input image.

9. A mobile device comprising:
detecting means for detecting an object by using the image recognition device according to claim 8; and
moving means for moving to a predetermined position to the detected object.

10. An image processing device comprising:
means for producing a first image having a first resolution and a second image having a same image content as the first image at a second resolution lower than the first resolution, based on an input image;
luminance outputting means for sequentially outputting luminances of pixels constituting the first and second images based on an order of pixels;
gradient direction outputting means for sequentially outputting gradient directions of luminances of respective pixels of the first and second images in parallel by using the sequentially output luminances;
a timing controller for controlling timings to supply pieces of gradient directions of luminances of the first and second images;
co-occurrence matrix preparing means that receive the supplied pieces of gradient directions of luminances of the first and second images, the co-occurrence matrix preparing means being for preparing a co-occurrence matrix including co-occurrences of the gradient directions occurring in both the first and second images by sequentially combining the sequentially output gradient directions for each of the first and second images, the co-occurrence matrix preparing means:
sequentially identifying a gradient direction of a pixel of interest and gradient directions of pixels which are combined with the pixel of interest based on an order of outputting the gradient directions for each of the first and second images which are sequentially output from the gradient direction outputting means; and
sequentially performing voting in the co-occurrence matrix based on combinations of the identified gradient directions to prepare the co-occurrence matrix; and
co-occurrence matrix outputting means for outputting the prepared co-occurrence matrix as an image feature amount of the input image.

11. The image processing device according to claim 10, wherein the co-occurrence matrix preparing means arranges the gradient directions in arrays, in which the pixel of interest is associated with positions of the pixels combined with the pixel of interest and which are provided for each of the first and second images based on the outputting order for each of the first and second images to identify the gradient directions of the combined pixels.

12. The image processing device according to claim 11, wherein the arrays are constituted of six arrays corresponding to respective pairs of pixel rows which are vertically adjacent to each other for each of the first and second images, and
the co-occurrence matrix preparing means arranges the gradient directions in each pair of pixel rows for each of the first and second images in the corresponding pair of arrays, and identifies the gradient directions of the combined pixels based on positions at which the gradient directions are arranged.

13. A semiconductor device comprising:
the image processing device according to claim 10 mounted therein.

14. An image recognition device comprising:
the image processing device according to claim 10; and
recognizing means for comparing a histogram based on a co-occurrence matrix output from the image processing device with a histogram based on a co-occurrence matrix of a reference image to recognize an object shown in the input image.

15. A mobile device comprising:
detecting means for detecting an object by using the image recognition device according to claim 14; and
moving means for moving to a predetermined position to the detected object.

16. An image processing method comprising:
producing a first image having a first resolution and a second image having a same image content as the first image at a second resolution lower than the first resolution, based on an input image;
a luminance output step of sequentially outputting luminances of pixels constituting the first and second images based on an order of the pixels;
a gradient direction output step of sequentially outputting gradient directions of the luminances of respective pixels of the first and second images in parallel by using the sequentially output luminances, the gradient direction output step comprising:
a first resolution-specific gradient direction outputting step of outputting gradient directions of luminances of the pixels of the first image at the first resolution; and
a second resolution-specific gradient direction outputting step parallel to the first resolution-specific gradient direction outputting step, the second resolution-specific gradient direction outputting step being of outputting gradient directions of luminances of the pixels of the second image at the second resolution, the first and second resolution-specific gradient direction outputting steps being concurrently performed to sequentially output the gradient directions for each of the first and second images in parallel;

a timing control step for controlling timings to supply pieces of gradient directions of luminances of the first and second images to a co-occurrence matrix preparation step of preparing a co-occurrence matrix including co-occurrences of the gradient directions occurring in both the first and second images by sequentially combining the sequentially output gradient directions for each of the first and second images; and a co-occurrence matrix output step of outputting the prepared co-occurrence matrix as an image feature amount of the input image.

* * * * *